US 10,495,049 B2

(12) United States Patent
Takazawa et al.

(10) Patent No.: US 10,495,049 B2
(45) Date of Patent: Dec. 3, 2019

(54) CONTROL DEVICE FOR INTERNAL COMBUSTION ENGINE

(71) Applicant: HONDA MOTOR CO., LTD., Tokyo (JP)

(72) Inventors: Masanobu Takazawa, Wako (JP); Hiroshi Hanabusa, Wako (JP); Haruya Kitano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 173 days.

(21) Appl. No.: 15/673,418

(22) Filed: Aug. 10, 2017

(65) Prior Publication Data

US 2018/0094616 A1 Apr. 5, 2018

(30) Foreign Application Priority Data

Oct. 5, 2016 (JP) .................................. 2016-196835

(51) Int. Cl.
| | |
|---|---|
| *F02P 5/152* | (2006.01) |
| *F01L 1/34* | (2006.01) |
| *F02D 41/00* | (2006.01) |
| *F02D 41/14* | (2006.01) |
| *F02P 5/153* | (2006.01) |

(52) U.S. Cl.
CPC ............ *F02P 5/152* (2013.01); *F01L 1/34* (2013.01); *F02D 41/0047* (2013.01); *F02D 41/1475* (2013.01); *F02P 5/153* (2013.01)

(58) Field of Classification Search
CPC .......... F02P 5/152; F02P 5/1521; F02P 5/153; F02D 41/0047; F02D 41/1475; F02D 41/0072; F02D 35/02; F02D 2041/1433; F02D 2200/0411

USPC ..................................................... 123/406.26
See application file for complete search history.

(56) References Cited

U.S. PATENT DOCUMENTS

| | | | | |
|---|---|---|---|---|
| 5,887,568 A * | 3/1999 | Takeyama | ............ | F02P 5/1502 |
| | | | | 123/306 |
| 7,255,089 B2 * | 8/2007 | Etou | .................. | F02D 15/00 |
| | | | | 123/406.29 |
| 2017/0314500 A1 * | 11/2017 | Ogata | ................ | F02M 26/00 |

FOREIGN PATENT DOCUMENTS

| | | |
|---|---|---|
| JP | 4066866 B2 | 10/2004 |
| JP | 2005-030305 | 2/2005 |
| JP | 2008-196506 | 8/2008 |

(Continued)

OTHER PUBLICATIONS

Japanese Office Action for corresponding JP Application No. 2016-196835, dated Dec. 19, 2017.

*Primary Examiner* — Mahmoud Gimie
(74) *Attorney, Agent, or Firm* — Mori & Ward, LLP

(57) ABSTRACT

A control device for an internal combustion engine includes an air-fuel ratio controller to execute a stoichiometric operation in which an air-fuel ratio of an air-fuel mixture in a combustion chamber of the internal combustion engine is set to a stoichiometric air-fuel ratio and a lean operation in which the air-fuel ratio is set to an air-fuel ratio leaner than the stoichiometric air-fuel ratio. A ignition timing controller is to calculate at least one ignition timing control parameter based on a laminar combustion velocity and to control an ignition plug provided in the combustion chamber to ignite based on the at least one ignition timing control parameter in a transitional state between the stoichiometric operation and the lean operation.

6 Claims, 9 Drawing Sheets

(56) References Cited

FOREIGN PATENT DOCUMENTS

| JP | 2016-006305 | 1/2016 |
|----|-------------|--------|
| JP | 2016-017459 | 2/2016 |

\* cited by examiner

CONTROL DEVICE FOR INTERNAL COMBUSTION ENGINE

CROSS-REFERENCE TO RELATED APPLICATIONS

The present application claims priority under 35 U.S.C. § 119 to Japanese Patent Application No. 2016-196835, filed Oct. 5, 2016, entitled "Control Device of Internal Combustion Engine." The contents of this application are incorporated herein by reference in their entirety.

BACKGROUND

1. Field

The present disclosure relates to a control device for an internal combustion engine.

2. Description of the Related Art

For example, Japanese Unexamined Patent Application Publication No. 2005-30305 discloses performing a lean operation in which the air-fuel ratio of an air-fuel mixture combusted in an engine is set to a lean air-fuel ratio (for example, "30") which is on a lean side compared to the stoichiometric air-fuel ratio and enables sufficient lowering of the NOx concentration in exhaust gas (feed gas) discharged from a combustion chamber for the purpose of reducing the discharge amount of NOx and improving the fuel efficiency (enhancing the combustion efficiency), and this technique has been widely known.

Further, as disclosed in Japanese Patent No. 4066866, a method has been known, the method calculating a maximum torque ignition timing (minimum spark advance for best torque (MBT)) at which the output torque of the engine is maximized by using a laminar combustion velocity of combustion gas in the combustion chamber.

Japanese Unexamined Patent Application Publication No. 2016-17459 discloses a control scheme of an intake air amount and an exhaust gas reflux amount in a transient state in which switching from a stoichiometric operation to a lean operation or the opposite switching is performed.

SUMMARY

According to one aspect of the present invention, a control device for an internal combustion engine that includes an ignition plug which is provided in a combustion chamber of the internal combustion engine and an exhaust gas reflux mechanism which refluxes exhaust gas of the engine to an intake system, the control device including: an air-fuel ratio control unit that executes a stoichiometric operation in which an air-fuel ratio (AF) of an air-fuel mixture in the combustion chamber is set to a stoichiometric air-fuel ratio (AFST) and a lean operation in which the air-fuel ratio is set to a lean side of the stoichiometric air-fuel ratio; an exhaust gas reflux control unit that controls an exhaust gas reflux rate (REGR) by the exhaust gas reflux mechanism; a laminar combustion velocity calculation unit that calculates a laminar combustion velocity (SL) of combustion gas in the combustion chamber by using a parameter (φ) which indicates the air-fuel ratio (AF) and the exhaust gas reflux rate (REGR); and an ignition timing control unit that calculates ignition timing control parameters (IGMAP, IGKNK, and IGLGG) by using the laminar combustion velocity (SL) which is calculated by the laminar combustion velocity calculation unit in a transient state where a transition from the stoichiometric operation to the lean operation or an opposite transition is performed and that controls an ignition timing (IGLOG) by the ignition plug by using the calculated ignition timing control parameters.

According to another aspect of the present invention, a control device for an internal combustion engine includes an air-fuel ratio controller, an exhaust gas reflux controller, a laminar combustion velocity calculator, an ignition timing controller. The air-fuel ratio controller is to execute a stoichiometric operation in which an air-fuel ratio of an air-fuel mixture in a combustion chamber of the internal combustion engine is controlled to be a stoichiometric air-fuel ratio and a lean operation in which the air-fuel ratio is controlled to be an air-fuel ratio leaner than the stoichiometric air-fuel ratio. The exhaust gas reflux controller is to control an exhaust gas reflux mechanism to reflux an exhaust gas from the combustion chamber to an intake system of the internal combustion engine to control an exhaust gas reflux rate. The laminar combustion velocity calculator is to calculate a laminar combustion velocity of combustion gas in the combustion chamber based on the exhaust gas reflux rate and a parameter indicating the air-fuel ratio. The ignition timing controller is to calculate at least one ignition timing control parameter based on the laminar combustion velocity calculated by the laminar combustion velocity calculator and to control an ignition plug provided in the combustion chamber to ignite based on the at least one ignition timing control parameter in a transitional state between the stoichiometric operation and the lean operation.

According to further aspect of the present invention, a control device for an internal combustion engine includes air-fuel ratio control means, exhaust gas reflux control means, laminar combustion velocity calculating means, and ignition timing control means. The air-fuel ratio control means are for executing a stoichiometric operation in which an air-fuel ratio of an air-fuel mixture in a combustion chamber of the internal combustion engine is controlled to be a stoichiometric air-fuel ratio and a lean operation in which the air-fuel ratio is controlled to be an air-fuel ratio leaner than the stoichiometric air-fuel ratio. The exhaust gas reflux control means are for controlling an exhaust gas reflux mechanism to reflux an exhaust gas from the combustion chamber to an intake system of the internal combustion engine to control an exhaust gas reflux rate. The laminar combustion velocity calculating means are for calculating a laminar combustion velocity of combustion gas in the combustion chamber based on the exhaust gas reflux rate and a parameter indicating the air-fuel ratio. The ignition timing control means are for calculating at least one ignition timing control parameter based on the laminar combustion velocity calculated by the laminar combustion velocity calculating means and controlling an ignition plug provided in the combustion chamber to ignite based on the at least one ignition timing control parameter in a transitional state between the stoichiometric operation and the lean operation.

DESCRIPTION OF THE EMBODIMENTS

Figure 1:
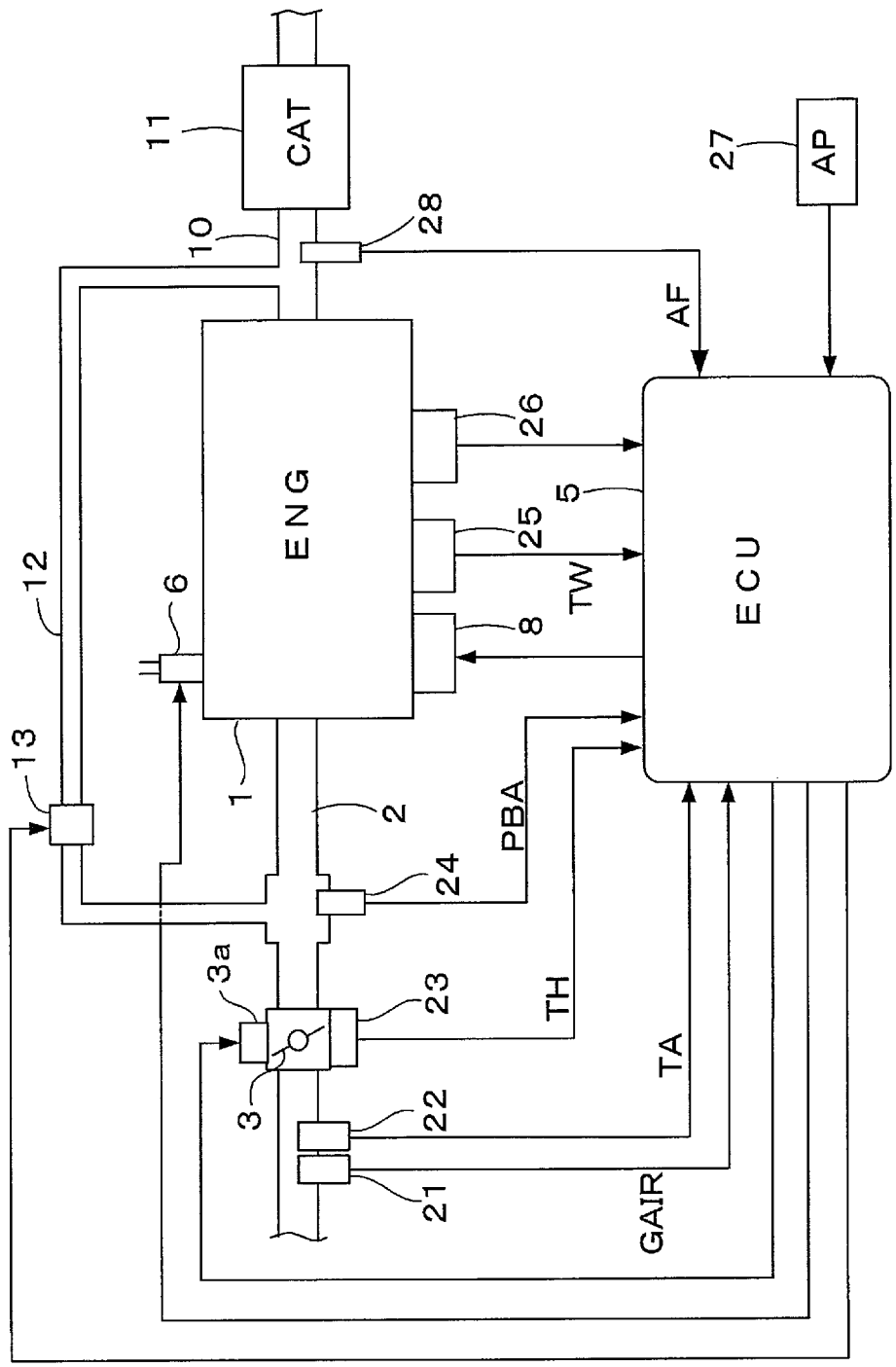
FIG. 1 is a diagram that illustrates a configuration of an internal combustion engine and a control device according to a first embodiment of the present disclosure.

The embodiments will now be described with reference to the accompanying drawings, wherein like reference numerals designate corresponding or identical elements throughout the various drawings.

Embodiments of the present disclosure will hereinafter be described with reference to drawings.

First Embodiment

FIG. 1 is a diagram that illustrates a configuration of a direct injection type internal combustion engine and a control device according to a first embodiment of the present disclosure. An internal combustion engine (hereinafter referred to as "engine") 1 illustrated in FIG. 1 has four cylinders, for example, and each of the cylinders is provided with an injector 6 that directly injects fuel into a combustion chamber. Actuation of the injector 6 is controlled by an electronic control unit (hereinafter referred to as "ECU") 5. Further, an ignition plug 8 is mounted on each of the cylinders of the engine 1, and the ignition timing by the ignition plug 8 is controlled by the ECU 5. A throttle valve 3 is arranged in an intake path 2 of the engine 1.

The ECU 5 is connected with an intake air amount sensor 21 that detects an intake air amount GAIR of the engine 1, an intake air temperature sensor 22 that detects an intake air temperature TA, a throttle valve opening sensor 23 that detects a throttle valve opening TH, an intake air pressure sensor 24 that detects an intake air pressure PBA, a cooling water temperature sensor 25 that detects an engine cooling water temperature TW, a crank angle position sensor 26 that detects a rotational angle of a crankshaft (not illustrated) of the engine 1, an accelerator sensor 27 that detects an accelerator pedal manipulation amount AP of a vehicle driven by the engine 1, and other sensors (for example, a vehicle speed sensor, an atmospheric pressure sensor, and so forth), which are not illustrated. Detection signals of those sensors are supplied to the ECU 5. The crank angle position sensor 26 outputs plural pulse signals that indicate crank angle positions, and the pulse signals are used for various kinds of timing control of a fuel injection timing, the ignition timing, and so forth and for detection of an engine RPM (rotational speed) NE.

An exhaust gas purification catalyst (for example, a three-way catalyst) 11 is provided in an exhaust path 10. An air-fuel ratio sensor 28 is mounted on an upstream side of the exhaust gas purification catalyst 11 and on a downstream side of a collecting portion of an exhaust manifold that communicates with each of the cylinders, detects the oxygen concentration in the exhaust gas in the exhaust path 10, and thereby detects an air-fuel ratio AF of an air-fuel mixture combusted in the combustion chamber.

The engine 1 includes an exhaust gas reflux mechanism, and this exhaust gas reflux mechanism has an exhaust gas reflux path 12 that connects the exhaust path 10 and the intake path 2 together and an exhaust gas reflux control valve (hereinafter referred to as "EGR valve") 13 that controls the flow amount of the exhaust gas which passes through the exhaust gas reflux path 12. Actuation of the EGR valve 13 is controlled by the ECU 5.

The ECU 5 is in a configuration in related art that includes a CPU, a memory, input-output circuit, and so forth and performs fuel injection control of the injector 6, ignition timing control of the ignition plug 8, intake air amount control of an actuator 3a and the throttle valve 3, and exhaust gas reflux control of the EGR valve 13 in accordance with the engine operation state (mainly the engine RPM NE and a requested torque TRQCMD). The requested torque TRQCMD is calculated mainly in accordance with the accelerator pedal manipulation amount AP and is calculated so as to increase as the accelerator pedal manipulation amount AP increases. Further, a target intake air amount GAIRCMD is calculated in accordance with a target air-fuel ratio AFCMD and the requested torque TRQCMD and is calculated so as to be substantially proportional to the target air-fuel ratio AFCMD and the requested torque TRQCMD. The intake air amount control in which the actuator 3a drives the throttle valve 3 is performed such that the detected intake air amount GAIR matches the target intake air amount GAIRCMD.

A fuel injection amount (mass) GINJ by the injector 6 is controlled by correcting a basic fuel amount GINJB calculated by using the intake air amount GAIR by using an air-fuel ratio correction coefficient KAF in accordance with a target equivalence ratio KCMD and the air-fuel ratio AF detected by the air-fuel ratio sensor 28. The air-fuel ratio correction coefficient KAF is calculated such that the detected air-fuel ratio AF (detection equivalence ratio KACT) matches the target air-fuel ratio AFCMD (target equivalence ratio KCMD). The equivalence ratio is proportional to the reciprocal of the air-fuel ratio AF and is a parameter that becomes "1.0" in a case where the air-fuel ratio AF is equivalent to the stoichiometric air-fuel ratio (14.7). Note that the fuel injection amount GINJ is converted to a valve opening time TOUT of the injector 6 in accordance with a fuel pressure PF, the density of fuel, and so forth by using a method in related art and is controlled such that the fuel amount supplied into the combustion chamber per cycle becomes the fuel injection amount GINJ. The fuel injection amount GINJ is calculated by using the following formula (1).

$$GINJ = GINJB \times KCMD \times KAF \times KTOTAL \quad (1)$$

GINJB is the basic fuel amount that is calculated such that the air-fuel ratio of the air-fuel mixture becomes the stoichiometric air-fuel ratio AFST (=14.7) in accordance with the intake air amount GAIR, and the target equivalence ratio KCMD is expressed by the following formula (2) by using the target air-fuel ratio AFCMD. KTOTAL is a product of correction coefficients other than the target equivalence ratio KCMD and the air-fuel ratio correction coefficient KAF (for example, a correction coefficient in accordance with the engine cooling water temperature and so forth).

$$KCMD=AFST/AFCMD \quad (2)$$

Figure 2:
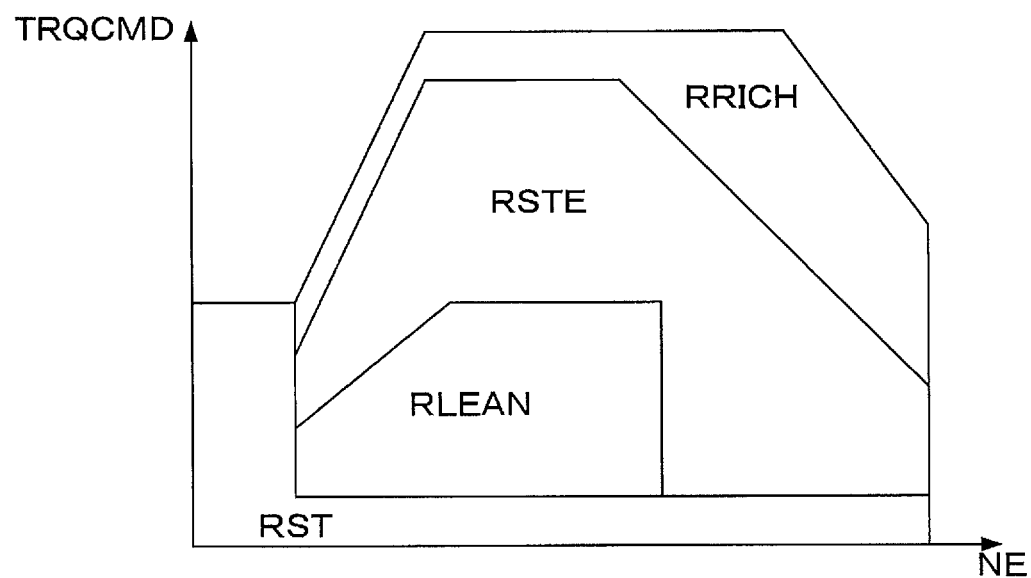
FIG. 2 is a diagram for explaining setting of a target air-fuel ratio (AFCMD) in accordance with an engine operation region that is defined by an engine rotational speed (NE) and a requested torque (TRQCMD).

FIG. 2 is a diagram for explaining setting of the target air-fuel ratio AFCMD in accordance with the operation region of the engine 1 that is defined by the engine RPM NE and the requested torque TRQCMD. The target air-fuel ratio AFCMD is set to the stoichiometric air-fuel ratio AFST in a first region RST (stoichiometric operation region) that corresponds to a low rotation low-to-intermediate load region and an intermediate-to-high rotation low load region, is set to a prescribed lean air-fuel ratio AFLN in a second region (lean operation region) RLEAN that corresponds to an intermediate rotation intermediate load region, is set to the stoichiometric air-fuel ratio AFST in a third region RSTE that corresponds to a region on a high load side and a high rotation side of the second region RLEAN, and is set to a richer side air-fuel ratio AFRO than the stoichiometric air-fuel ratio AFST in a fourth region RRICH that corresponds to a region on a much higher load side than the third region RSTE. The exhaust gas reflux by the exhaust gas reflux mechanism is not performed in the first region RST, but the exhaust gas reflux by the exhaust gas reflux mechanism is performed in the third region RSTE. The prescribed lean air-fuel ratio AFLN is set to a value at which the NOx concentration in the exhaust gas (feed gas) discharged from the combustion chamber is lower than an allowable limit and which may realize stable combustion, to "30", for example. In the transient state where a transition from the second region RLEAN to the first region RST or the third region RSTE or the opposite transition is performed, the air-fuel ratio and the exhaust gas reflux rate are together changed.

In this embodiment, in the transient state where the transition from the second region RLEAN to the first region RST or the third region RSTE or the opposite transition is performed, a laminar combustion velocity SL of combustion gas in the combustion chamber of the engine 1 is calculated, and calculation of ignition timing control parameters is performed by using the laminar combustion velocity SL.

Figure 3:
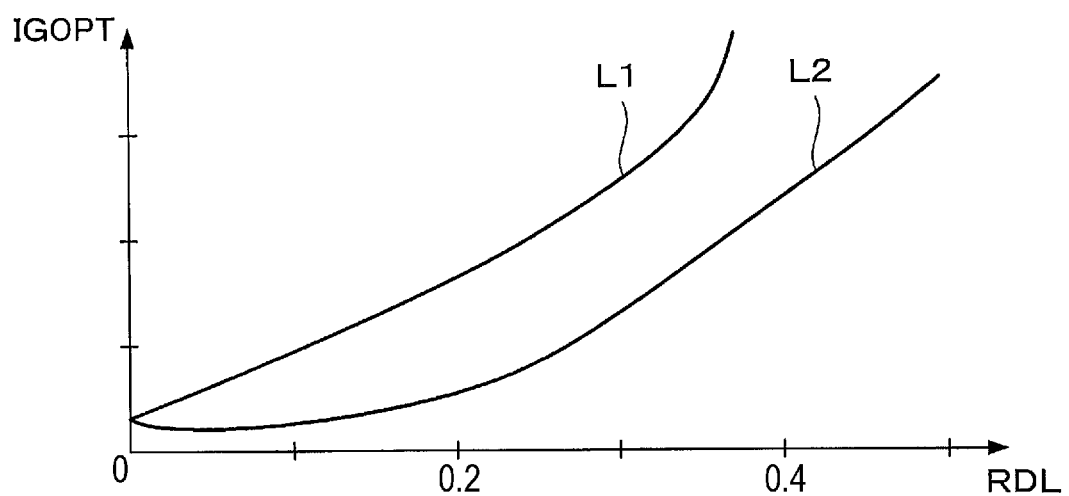
FIG. 3 is a graph that represents the relationship between a fuel dilution ratio (RDL) under a condition of a regular engine rotational speed and an optimal ignition timing (IGOPT).

Next, a description will be made about details of the ignition timing control in this embodiment. FIG. 3 is a graph that represents the relationship between a fuel dilution ratio RDL under a condition of a regular engine RPM NE and an optimal ignition timing IGOPT. The fuel dilution ratio RDL is defined by the following formula (3) and is a parameter that indicates the dilution degree of fuel in the combustion chamber. The optimal ignition timing IGOPT corresponds to an ignition timing on a retard angle side of either one of a maximum torque ignition timing (MBT) at which an output torque of the engine 1 becomes the maximum and a knock-limit ignition timing. Note that the knock-limit ignition timing corresponds to the most advanced angle value in an ignition timing range in which the possibility that knocking occurs is low.

$$RDL = \frac{AFST+1}{\left(\frac{AF+1}{REGRE}+AFST+1\right) \times AFST} \times (1+AF) \quad (3)$$

Here, AF is the air-fuel ratio as the ratio between the air amount in the combustion chamber (fresh air amount+air amount in reflux exhaust gas) and the fuel injection amount GINJ, AFST is the stoichiometric air-fuel ratio (=14.7), and REGRE is an external exhaust gas reflux rate that represents the proportion of the exhaust gas amount that is refluxed into the combustion chamber via the exhaust gas reflux mechanism to the whole gas amount. As the air-fuel ratio AF increases and the external exhaust gas reflux rate REGRE increases, the dilution ratio RDL increases.

Curve L1 illustrated in FIG. 3 is correspondent to a case where the air-fuel ratio AF is maintained at the stoichiometric air-fuel ratio AFST and the external exhaust gas reflux rate REGRE is increased, and curve L2 is correspondent to a case where external exhaust gas reflux is not performed and the air-fuel ratio AF is increased from the stoichiometric air-fuel ratio AFST. In such a manner, even in a case where the dilution ratio RDL is the same, the optimal ignition timing IGOPT becomes different values between a case where the air-fuel ratio AF changes and a case where the external exhaust gas reflux rate REGRE changes. Thus, in a case of employing a configuration that calculates the optimal ignition timing IGOPT by using the dilution ratio RDL in which the air-fuel ratio AF and the external exhaust gas reflux rate REGRE are integrated, setting of maps has to be performed in response to each of the air-fuel ratio AF and the external exhaust has reflux rate REGRE. Note that dilution of fuel is also performed by internal exhaust gas reflux due to the combustion gas remaining in the combustion chamber, similarly to the external exhaust gas reflux. Thus, in the following description, the whole exhaust gas reflux rate by the internal exhaust gas reflux and the external exhaust gas reflux will be referred to as "exhaust gas reflux rate REGR".

The inventor of the present disclosure studied a control method for calculating the laminar combustion velocity SL of the combustion gas that changed depending mainly on the air-fuel ratio AF and the exhaust gas reflux rate REGR and for calculating the ignition timing control parameters such as a maximum torque ignition timing IGMAP by using the laminar combustion velocity SL. The results of this study are illustrated in FIGS. 4A to 4C.

Figure 4A:
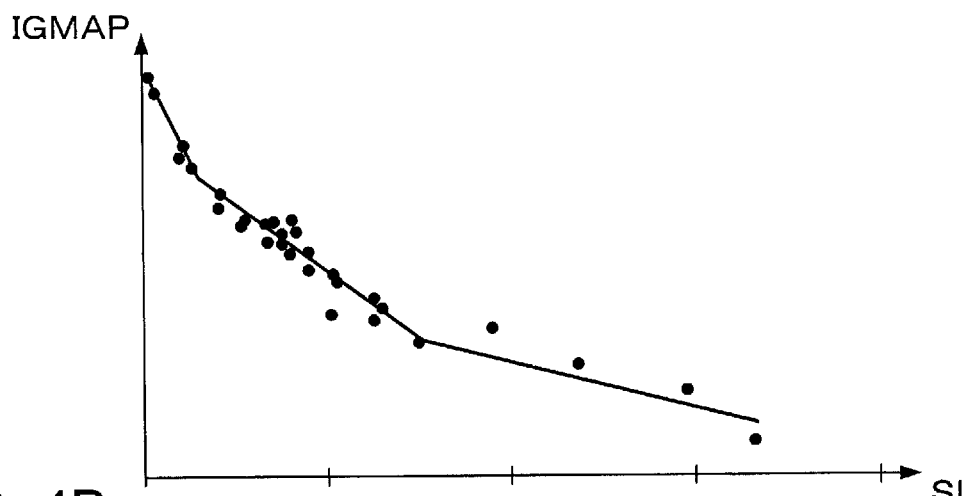
FIGS. 4A to 4C are graphs that represent the relationships between a laminar combustion velocity (SL) and ignition timing control parameters (IGMAP, IGKNK, and IGLGG).
Figure 4B:
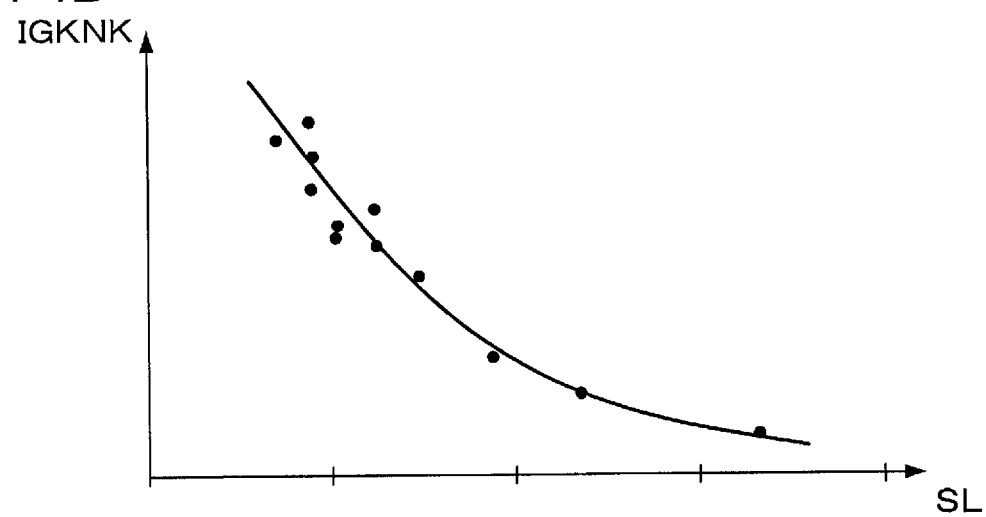
Figure 4C:
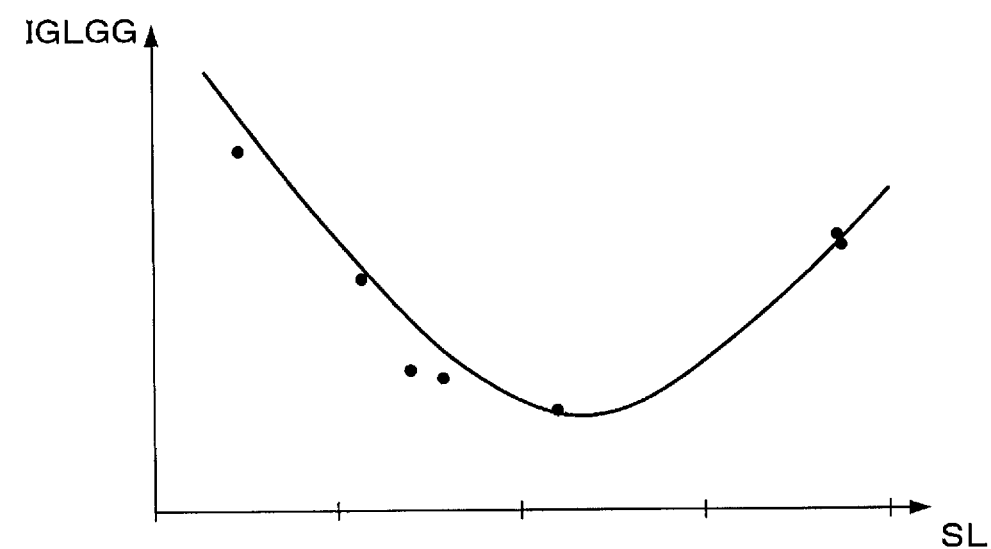
Figure 5A:
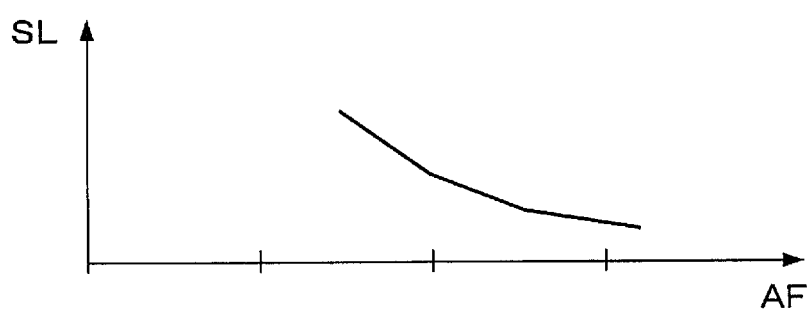
FIGS. 5A to 5D are graphs that represent the relationships between an air-fuel ratio (AF), an exhaust gas reflux rate (REGR), a gas temperature in a combustion chamber (TGAS), and a cylinder internal pressure (PCYL) and the laminar combustion velocity (SL).
Figure 5B:
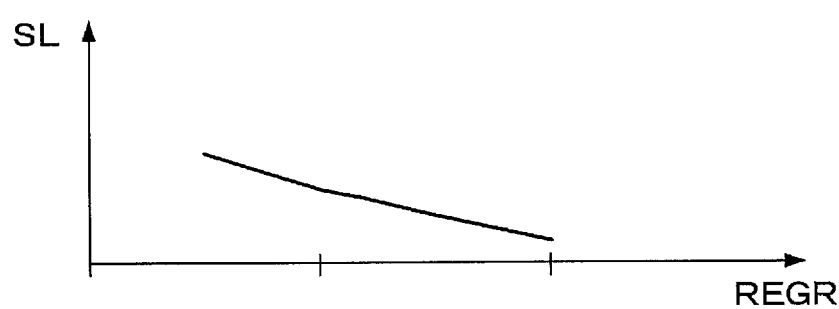
Figure 5C:
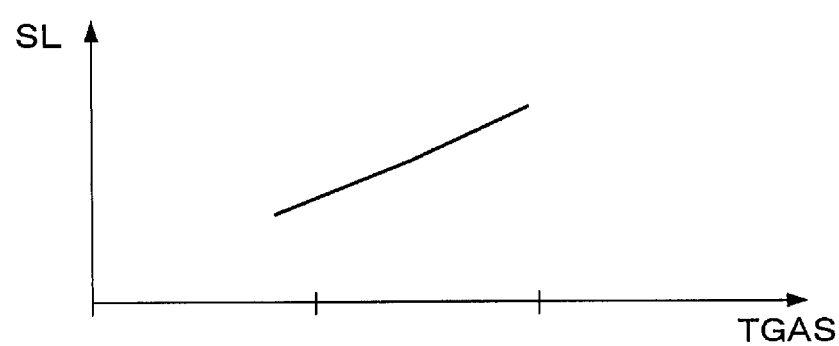
Figure 5D:
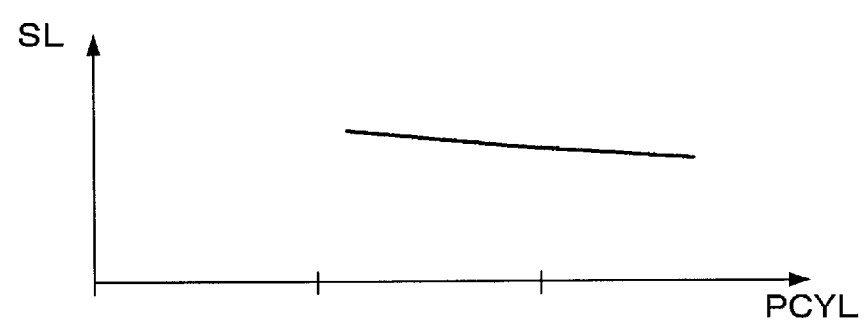

FIGS. 4A to 4C are graphs that represent the relationships between the laminar combustion velocity SL and three ignition timing control parameters (maximum torque ignition timing IGMAP, knock-limit ignition timing IGKNK, and retard angle limit ignition timing IGLGG) under a condition of the regular engine RPM NE and the regular fuel injection amount GINJ (requested torque TRQCMD). The results confirm that even in a case where the air-fuel ratio AF and the exhaust gas reflux rate REGR are changed, an optimal value may be calculated by one curve illustrated in each of FIGS. 4A to 4C. Filled circles indicated in FIGS. 4A to 4C indicate actually measured data in a case where the air-fuel ratio AF and the exhaust gas reflux rate REGR are changed, for reference. The actually measured data are correspondent to the operation state where the air-fuel ratio AF and/or the exhaust gas reflux rate REGR are higher (the dilution ratio RDL is higher) as the laminar combustion velocity SL is lower. The ignition timing herein is defined by an advance angle amount with respect to the compression stroke finishing top dead center as a reference.

In this embodiment, in the transient state where the air-fuel ratio AF and/or the exhaust gas reflux rate REGR are changed, the laminar combustion velocity SL is first calculated by using the air-fuel ratio AF and the exhaust gas reflux rate REGR, and the three ignition timing control parameters illustrated in FIGS. 4A to 4C are calculated by using the laminar combustion velocity SL.

As a calculation method of the laminar combustion velocity SL, it is possible to use a method in related art, which is disclosed in above Japanese Patent No. 4066866 or Japanese Unexamined Patent Application Publication No. 2016-17459, the entire contents of which are incorporated herein by reference. However, in this embodiment, the laminar combustion velocity SL is calculated by using the following formula (4).

$$SL = A(\phi) \times C(REGR) \times \left(\frac{PCYL}{PREF}\right)^{-\alpha} \times \exp(B(\phi) \times TGAS) \quad (4)$$

In formula (4), φ is an excess air ratio that is defined by (AF/AFST), PCYL is the cylinder internal pressure (combustion chamber internal pressure) at a time immediately before ignition, PREF is a reference pressure (the intake air pressure PBA is applied), TGAS is the gas temperature in the combustion chamber at a time immediately before ignition, and A(φ), C(REGR), α, and B(φ) are variables that are calculated by using the following formulas (5) to (9).

$$A(\phi) = \sum_{i=1}^{m1} A_i \times \phi^i \quad (5)$$

$$C(REGR) = \sum_{i=1}^{m2} D \times REGR^i \quad (6)$$

$$D = \sum_{j=1}^{m3} D_j \times TGAS^j \quad (7)$$

$$\alpha = \sum_{i=1}^{m4} AL_i \times \phi^i \quad (8)$$

$$B(\phi) = \sum_{i=1}^{m5} B_i \times \phi^i \quad (9)$$

In above formulas (5) to (9), m1 to m5 are integers that are decided by experiments or simulations, and $A_1$ to $A_{m1}$, $D_1$ to $D_{m3}$, $AL_1$ to $AL_{m4}$, and $B_1$ to $B_{m5}$ are constants that are decided by experiments or simulations.

Because, strictly speaking, the cylinder internal pressure PCYL and the gas temperature TGAS change depending on the ignition timing, in this embodiment, the cylinder internal pressure PCYL at the ignition timing (hereinafter referred to as "previous ignition timing") IGLOGZ that is calculated in last computation is estimated by the following formula (10), and the gas temperature TGAS is calculated by further applying the cylinder internal pressure PCYL to the following formula (11).

$$PCYL = PBA \times (V0/VIG)^{\kappa} \quad (10)$$

$$TGAS = PCYL \times VIG/(R \times GGAS) \quad (11)$$

In formula (10), V0 is the combustion chamber volume at an intake valve closing timing, VIG is the ignition timing combustion chamber volume at the previous ignition timing IGLOGZ, and κ is the (preset) heat capacity ratio of the air-fuel mixture in the combustion chamber. Further, in formula (11), R is the gas constant, and GGAS is the mass of gas in the combustion chamber and corresponds to the total of a cylinder intake air amount GAIRCYL, a reflux exhaust gas amount GEGR, and the fuel injection amount GINJ.

The exhaust gas reflux rate REGR is calculated by a method in related art (for example, a method disclosed in Japanese Patent No. 5270008, the entire contents of which are incorporated herein by reference), and the excess air ratio φ is calculated by the following formula (12) by using the target air-fuel ratio AFCMD as the air-fuel ratio AF. That is, the reciprocal of the target equivalence ratio KCMD is used.

$$\phi = AFCMD/AFST \quad (12)$$

FIGS. 5A to 5D represent the relationships between the air-fuel ratio AF, the exhaust gas reflux rate REGR, the gas temperature TGAS, and the cylinder internal pressure PCYL and the laminar combustion velocity SL. That is, the laminar combustion velocity SL lowers as the air-fuel ratio AF increases, the laminar combustion velocity SL lowers as the exhaust gas reflux rate REGR increases, the laminar combustion velocity SL rises as the gas temperature TGAS becomes higher, and the laminar combustion velocity SL lowers as the cylinder internal pressure PCYL becomes higher.

Figure 6:
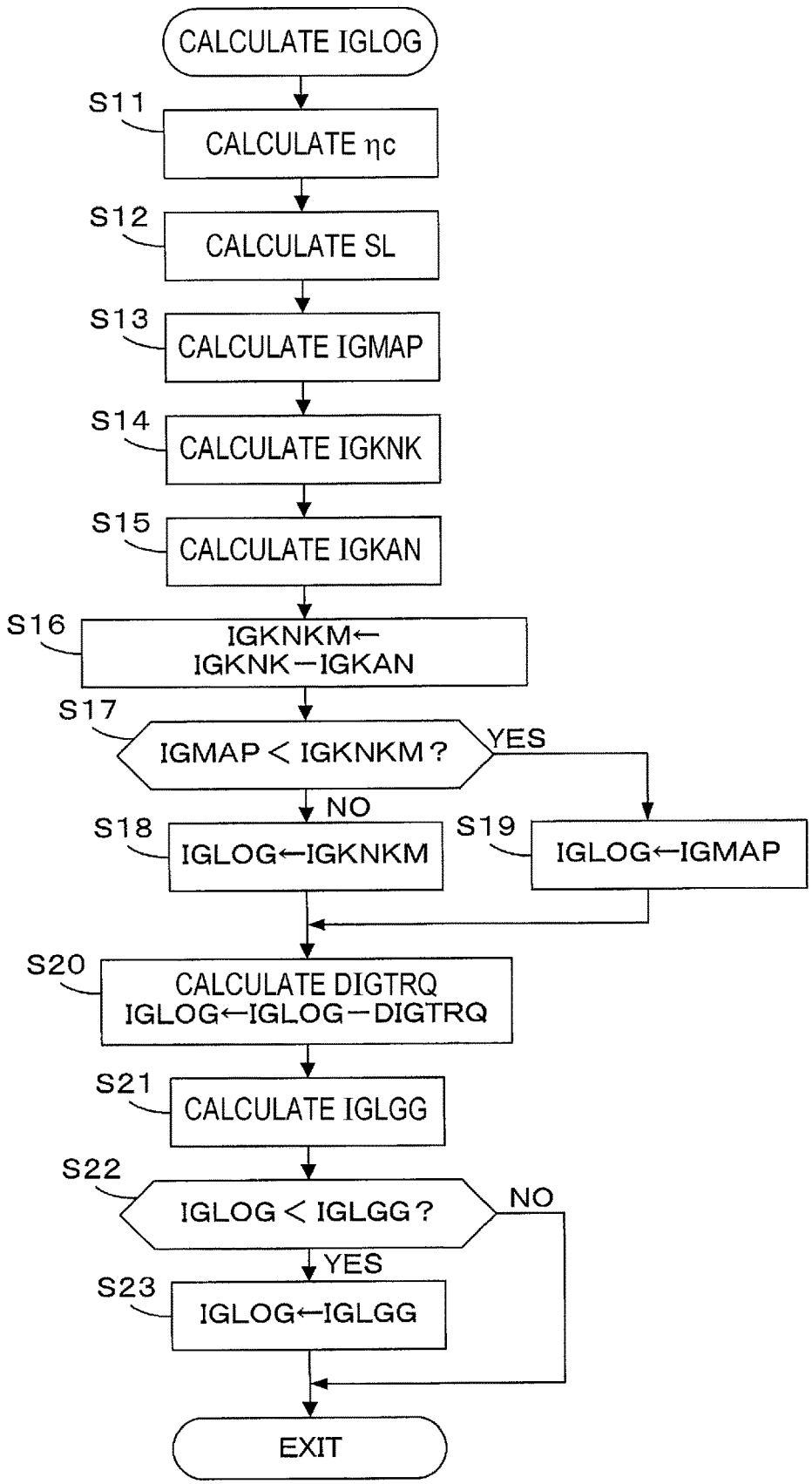
FIG. 6 is a flowchart of a process for calculating an ignition timing (IGLOG) in a transient state where the air-fuel ratio is changed.

FIG. 6 is a flowchart of a process for calculating the ignition timing IGLOG in the above-described transient state. This process is executed in the ECU 5 while being synchronized with the rotation of the engine 1.

In step S11, a charging efficiency ηc is calculated by using the detected intake air amount GAIR. Specifically, the cylinder intake air amount GAIRCYL as the intake air amount in one combustion cycle of one cylinder is calculated from the intake air amount GAIR, the cylinder intake air amount GAIRCYL is divided by a reference intake air amount GAIRBASE, and the charging efficiency ηc is thereby calculated. The reference intake air amount GAIRBASE is the air amount that fills the combustion chamber volume in a case where a piston is at the bottom dead center in a standard atmospheric state (for example, the atmospheric pressure of 101.3 kPa, an air temperature of 20° C., and humidity of 60%).

In step S12, the laminar combustion velocity SL is calculated by using the above-described computation formula. In step S13, an IGMAP map set in accordance with the engine RPM NE and the laminar combustion velocity SL is searched, and the maximum torque ignition timing IGMAP is thereby calculated. The IGMAP map is set such that the maximum torque ignition timing IGMAP decreases (retards) as the laminar combustion velocity SL becomes higher (see FIG. 4A) and is set such that in a region in which the engine RPM NE is comparatively low, the maximum torque ignition timing IGMAP increases as the engine RPM NE increases.

Figure 7:
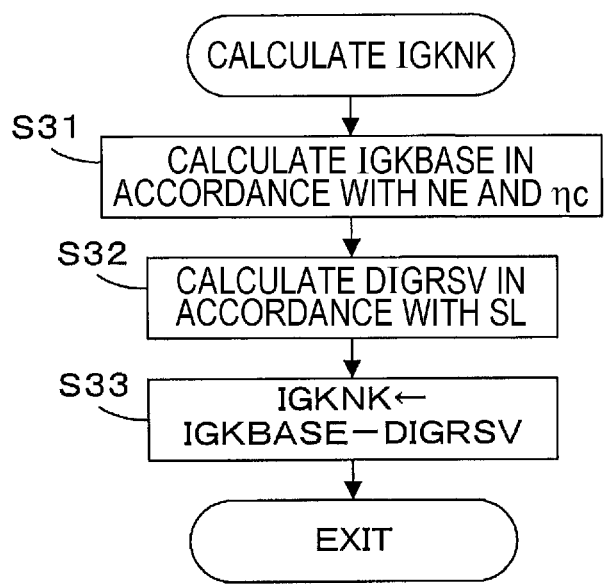
FIG. 7 is a flowchart of an IGKNK calculation process that is executed in the process of FIG. 6.

In step S14, an IGKNK calculation process illustrated in FIG. 7 is executed, and the knock-limit ignition timing IGKNK is thereby calculated. In step S15, an environmental correction value IGKAN (a retard angle correction value that makes the retard angle direction a positive value) is calculated. Specifically, the environmental correction value IGKAN is calculated by adding an intake air temperature correction value IGTA calculated in accordance with the intake air temperature TA, a cooling water temperature correction value IGTW calculated in accordance with the engine cooling water temperature TW, and an atmospheric pressure correction value IGPA calculated in accordance with an atmospheric pressure PA together.

In step S16, the knock-limit ignition timing IGKNK and the environmental correction value IGKAN are applied to the following formula (13), and a corrected knock-limit ignition timing IGKNKM is thereby calculated.

$$IGKNKM=IGKNK-IGKAN \qquad (13)$$

In step S17, a determination is made whether or not the maximum torque ignition timing IGMAP calculated in step S13 is less than the corrected knock-limit ignition timing IGKNKM. In a case where the answer is affirmative (YES), the ignition timing IGLOG is set to the maximum torque ignition timing IGMAP (step S19). On the other hand, in a case where the answer in step S17 is negative (NO), that is, in a case of IGMAP≥IGKNKM, the ignition timing IGLOG is set to the corrected knock-limit ignition timing IGKNKM (step S18).

In step S20, a torque correction value DIGTRQ is calculated, which is applied in a case where retard angle correction (hereinafter referred to as "torque reduction correction") of the ignition timing is performed so that an output torque TRQA of the engine 1 is caused to match the requested torque TRQCMD. The ignition timing IGLOG is updated in the retard angle direction by using the torque correction value DIGTRQ. In a case where the torque reduction correction is not performed, the torque correction value DIGTRQ is set to "0".

In step S21, an IGLGG map is searched in accordance with the engine RPM NE, the charging efficiency ηc, and the laminar combustion velocity SL, and the retard angle limit ignition timing IGLGG is thereby calculated. In the IGLGG map, the retard angle limit ignition timing IGLGG is set as illustrated in FIG. 4C in accordance with the laminar combustion velocity SL. That is, in the region in which the laminar combustion velocity SL is low, the retard angle limit ignition timing IGLGG is set to decrease to the minimum value as the laminar combustion velocity SL increases, and the retard angle limit ignition timing IGLGG is set to increase as the laminar combustion velocity SL further increases.

In step S22, a determination is made whether or not the ignition timing IGLOG is less than (on the retard angle side of) the retard angle limit ignition timing IGLGG. In a case where the answer is affirmative (YES), the ignition timing IGLOG is set to the retard angle limit ignition timing IGLGG (step S23). This is because accidental fire or unstable combustion occurs in a case where the ignition timing IGLOG is set to the retard angle side of the retard angle limit ignition timing IGLGG. In a case where the answer in step S22 is negative (NO), the process is immediately finished.

Figure 8A:
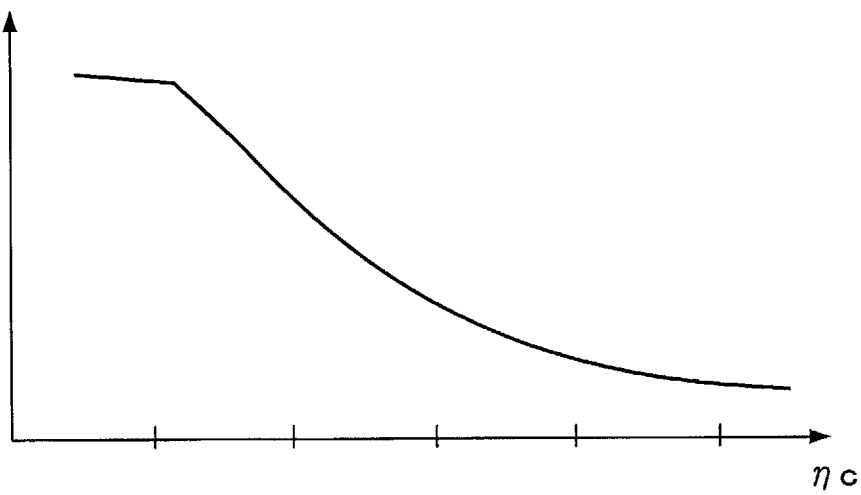
FIGS. 8A and 8B are graphs for explaining setting of maps that are used for calculation of a basic knock-limit ignition timing (IGKBASE).
Figure 8B:
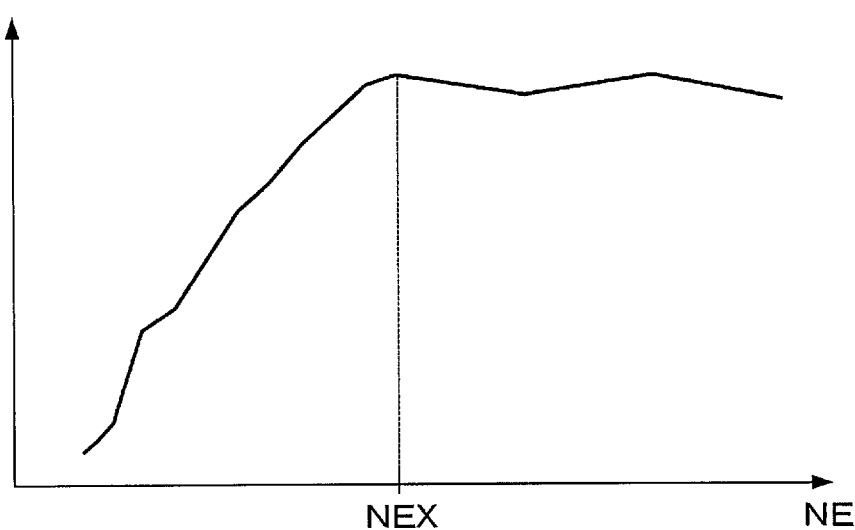

FIG. 7 illustrates the IGKNK calculation process that is executed in step S14 in FIG. 6. In step S31, an IGKBASE map is searched in accordance with the engine RPM NE and the charging efficiency ηc, and a basic knock-limit ignition timing IGKBASE is thereby calculated. The IGKBASE map is set such that the basic knock-limit ignition timing IGKBASE decreases as the charging efficiency ηc increases as illustrated in FIG. 8A and is set such that in a region in which the engine RPM NE is lower than a prescribed RPM NEX (for example, 3000 rpm), the basic knock-limit ignition timing IGKBASE increases as the engine RPM NE increases as illustrated in FIG. 8B.

Figure 9:
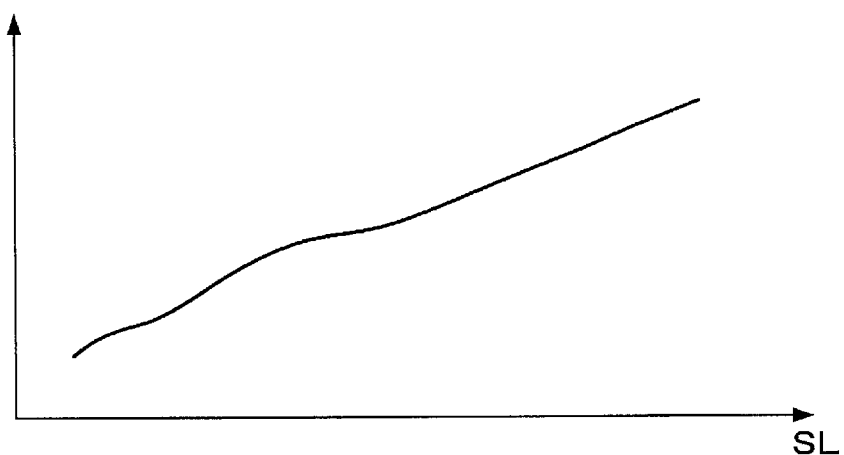
FIG. 9 is a diagram that illustrates a table used for calculating a retard angle correction value (DIGRSV) for correcting the basic knock-limit ignition timing.

In step S32, a DIGRSV table illustrated in FIG. 9 is searched in accordance with the laminar combustion velocity SL, and a knock retard angle correction value DIGRSV (>0) is thereby calculated. The DIGRSV table is set such that the knock retard angle correction value DIGRSV increases as the laminar combustion velocity SL increases.

In step S33, the knock retard angle correction value DIGRSV is subtracted from the basic knock-limit ignition timing IGKBASE, the basic knock-limit ignition timing IGKBASE is corrected in the retard angle direction, and the knock-limit ignition timing IGKNK is thereby calculated. Note that the knock-limit ignition timing IGKNK illustrated in FIG. 4B corresponds to the values that are calculated by the computation by steps S31 to S33.

As described above, in this embodiment, the laminar combustion velocity SL of combustion gas in the combustion chamber of the engine 1 is calculated by using the target equivalence ratio KCMD as the parameter indicating the air-fuel ratio AF and the exhaust gas reflux rate REGR. In the transient state where the transition from the stoichiometric operation to the lean operation or the opposite transition is performed, the calculated laminar combustion velocity SL is used to calculate the plural ignition timing control parameters, that is, the maximum torque ignition timing IGMAP, the knock-limit ignition timing IGKNK, and the retard angle limit ignition timing IGLGG. The ignition timing IGLOG is controlled by using those ignition timing control parameters. The study by the inventor of the present disclosure has confirmed that the relationships between the laminar combustion velocity SL and the ignition timing control parameter such as the maximum torque ignition timing IGMAP that maximizes the engine output torque may be approximated by one curve under a condition of the regular engine RPM NE or under conditions of the regular engine RPM NE and the regular charging efficiency ηc. The laminar combustion velocity SL is used to calculate the ignition timing control parameters, the optimal control values that are correspondent to the air-fuel ratio AF and the exhaust gas reflux rate REGR which change in the transient state may thereby be calculated by comparatively simple computation, and the computation process may thereby be simplified. Further, for example, it is possible to calculate the maximum torque ignition timing IGMAP by a single map that is set in accordance with the laminar combustion velocity SL and the engine RPM NE even in a case where the air-fuel ratio AF and/or the exhaust gas reflux rate REGR change. Thus, the number of map setting procedures in a design stage may be reduced.

In addition, the study by the inventor of the present disclosure has confirmed that using the laminar combustion velocity SL is effective for calculation of the retard angle limit ignition timing IGLGG and the knock-limit ignition timing IGKNK as well as the maximum torque ignition timing IGMAP. The laminar combustion velocity SL is used to calculate all of those control parameters, and a further significant effect of simplifying the computation process may thereby be obtained.

In this embodiment, the injector 6 and the ECU 5 configures an air-fuel ratio control unit, and the ECU 5 configures an exhaust gas reflux control unit, a laminar combustion velocity calculation unit, and an ignition timing control unit.

Second Embodiment

Figure 10:
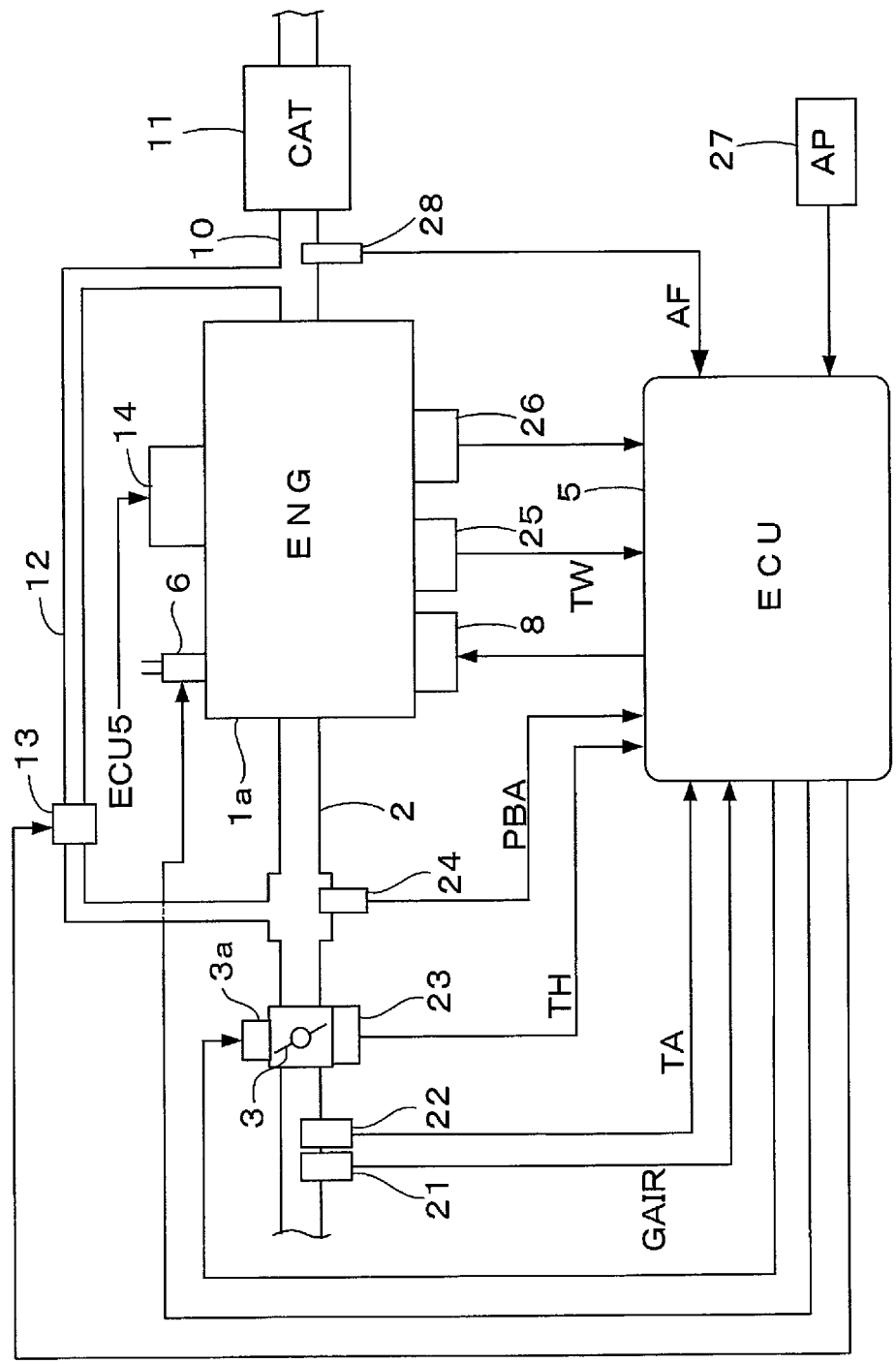
FIG. 10 is a diagram that illustrates a configuration of an internal combustion engine and the control device according to a second embodiment of the present disclosure.

As illustrated in FIG. 10, in this embodiment, the engine 1 in the first embodiment is changed to an engine 1a that includes an intake valve actuation phase variable mechanism 14 in related art. The intake valve actuation phase variable mechanism 14 continuously changes the actuation phase of an intake valve (not illustrated) of the engine 1a. The intake valve actuation phase variable mechanism 14 is connected with the ECU 5, and an intake valve actuation phase CAIN is controlled by the ECU 5. The intake valve actuation phase CAIN is defined as an advance angle amount with respect to the most retarded angle phase as a reference.

In this embodiment, in the above transient state, the maximum torque ignition timing IGMAP is calculated by using the intake valve actuation phase CAIN together with the above-described engine RPM NE and laminar combustion velocity SL. The knock-limit ignition timing IGKNK is calculated by using the intake valve actuation phase CAIN together with the engine RPM NE, the charging efficiency ηc, and the laminar combustion velocity SL.

Specifically, the maximum torque ignition timing IGMAP is calculated by the following formula (14).

$$IGMAP=IGMAPB+DIGMCAIN \tag{14}$$

Here, IGMAPB is a basic maximum torque ignition timing that is calculated by searching the IGMAP map set in accordance with the engine RPM NE and the laminar combustion velocity SL, similarly to the first embodiment. DIGMCAIN is a first valve actuation phase correction value that is calculated by using a method in related art in accordance with the intake valve actuation phase CAIN.

Figure 11:
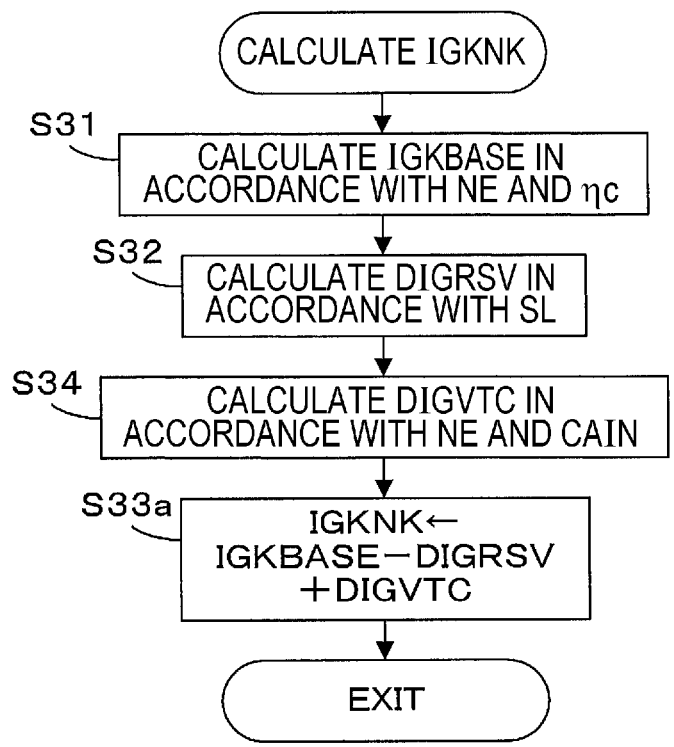
FIG. 11 is a flowchart of the IGKNK calculation process in the second embodiment.

FIG. 11 is a flowchart of the IGKNK calculation process in this embodiment. This process is the process illustrated in FIG. 7, to which step S34 is added and in which step S33 is replaced by the step S33*a*.

In step S34, a second valve actuation phase correction value DIGVTC is calculated by using a method in related art in accordance with the intake valve actuation phase CAIN.

In step S33*a*, the knock-limit ignition timing IGKNK is calculated by the following formula (15).

$$IGKNK=IGKBASE-DIGRSV+DIGVTC \tag{15}$$

As described above, in this embodiment, the maximum torque ignition timing IGMAP and the knock-limit ignition timing IGKNK are calculated by using the intake valve actuation phase CAIN. Thus, an appropriate control value may be obtained in response to the change in the intake valve actuation phase CAIN.

The present disclosure is not limited to the above-described embodiments, but various modifications are possible. For example, in the above-described embodiments, an example is described where the present disclosure is applied to the control device of the internal combustion engine that has a direct injection injector which injects fuel into the combustion chamber. However, the present disclosure is applicable to a control device of an internal combustion engine that has a port injection injector which injects fuel to an intake port or of an internal combustion engine that includes both of the direct injection injector and the port injection injector.

Further, in the above-described embodiments, the charging efficiency ηc is used for calculation of the knock-limit ignition timing IGKNK and the retard angle limit ignition timing IGLGG. However, because the charging efficiency ηc is calculated by using the cylinder intake air amount GAIRCYL, the cylinder intake air amount GAIRCYL or the intake air amount GAIR is used instead of the charging efficiency ηc, and the knock-limit ignition timing IGKNK and the retard angle limit ignition timing IGLGG may thereby be calculated.

Further, in the above-described embodiments, the cylinder internal pressure PCYL is estimated (calculated) by applying the intake air pressure PBA to formula (10). However, for example, the cylinder internal pressure PCYL that is detected by using a cylinder internal pressure sensor mounted on a tip portion of the injector 6 is applied to formula (4) and also applied to formula (11), and the gas temperature TGAS may thereby be calculated by using the detected cylinder internal pressure PCYL.

Further, the gas temperature TGAS may be calculated by using the detected intake air temperature TA.

A first aspect of the present disclosure provides a control device of an internal combustion engine that includes an ignition plug which is provided in a combustion chamber of the internal combustion engine and an exhaust gas reflux mechanism which refluxes exhaust gas of the engine to an intake system, the control device including: an air-fuel ratio control unit that executes a stoichiometric operation in which an air-fuel ratio (AF) of an air-fuel mixture in the combustion chamber is set to a stoichiometric air-fuel ratio (AFST) and a lean operation in which the air-fuel ratio is set to a lean side of the stoichiometric air-fuel ratio; an exhaust gas reflux control unit that controls an exhaust gas reflux rate (REGR) by the exhaust gas reflux mechanism; a laminar combustion velocity calculation unit that calculates a laminar combustion velocity (SL) of combustion gas in the combustion chamber by using a parameter (ϕ) which indicates the air-fuel ratio (AF) and the exhaust gas reflux rate (REGR); and an ignition timing control unit that calculates ignition timing control parameters (IGMAP, IGKNK, and IGLGG) by using the laminar combustion velocity (SL) which is calculated by the laminar combustion velocity calculation unit in a transient state where a transition from the stoichiometric operation to the lean operation or an opposite transition is performed and that controls an ignition timing (IGLOG) by the ignition plug by using the calculated ignition timing control parameters.

In this configuration, the laminar combustion velocity of combustion gas in the combustion chamber is calculated by using the parameter indicating the air-fuel ratio and the exhaust gas reflux rate. In the transient state where the transition from the stoichiometric operation to the lean operation or the opposite transition is performed, the calculated laminar combustion velocity is used to calculate the ignition timing control parameters. The ignition timing is controlled by using the ignition timing control parameters. The study by the inventor of the present disclosure has confirmed that the relationships between the laminar combustion velocity and the ignition timing control parameter such as the maximum torque ignition timing that maximizes the engine output torque may be approximated by one curve under a condition of a regular engine rotational speed or under conditions of the regular engine rotational speed and a regular charging efficiency. The laminar combustion velocity is used to calculate the ignition timing control parameters, the optimal control values that are correspondent to the air-fuel ratio and the exhaust gas reflux rate which change in the transient state may thereby be calculated by comparatively simple computation, and a computation process may thereby be simplified. Further, for example, it is possible to calculate the maximum torque ignition timing by a single map that is set in accordance with the laminar combustion velocity and the engine rotational speed even in a case where the air-fuel ratio and/or the exhaust gas reflux rate change. Thus, the number of map setting procedures (design procedures) in a design stage may be reduced.

A second aspect of the present disclosure provides the control device of an internal combustion engine according to the first aspect, in which the ignition timing control parameter may include plural control parameters (IGMAP, IGKNK, and IGLGG).

The study by the inventor of the present disclosure has confirmed that using the laminar combustion velocity is effective for calculation of the retard angle limit ignition timing and the knock-limit ignition timing as well as the maximum torque ignition timing. The laminar combustion velocity is used to calculate all of those control parameters, and significant effects of simplifying the computation process and of reducing the number of design procedures may thereby be obtained.

A third aspect of the present disclosure provides the control device of an internal combustion engine according to the first or second aspect, in which the ignition timing control parameter may include a maximum torque ignition timing (IGMAP) at which an output torque of the engine becomes a maximum, and the ignition timing control unit may calculate the maximum torque ignition timing (IGMAP) by using a single map that is set in accordance with the laminar combustion velocity (SL) and a rotational speed (NE) of the engine.

In this configuration, the maximum torque ignition timing is calculated by using a single map that is set in accordance with the laminar combustion velocity and the engine rotational speed. Thus, the computation process of the maximum torque ignition timing in the transient state may be simplified.

A fourth aspect of the present disclosure provides the control device of an internal combustion engine according to any one of the first to third aspects, in which the ignition timing control parameter may include a knock-limit ignition timing (IGKNK) that is correspondent to a most advanced angle value in an ignition timing range in which a possibility that knocking occurs in the engine is low, and the ignition timing control unit may calculate the knock-limit ignition timing (IGKNK) by using the laminar combustion velocity (SL), a rotational speed (NE) of the engine, and an intake air amount (GAIRCYL) of the engine.

In this configuration, the knock-limit ignition timing is calculated by using the laminar combustion velocity, the engine rotational speed, and the intake air amount. Thus, the computation process of the knock-limit ignition timing in the transient state may be simplified.

A fifth aspect of the present disclosure provides the control device of an internal combustion engine according to any one of the first to fourth aspects, in which the ignition timing control parameter may include a retard angle limit ignition timing (IGLGG) of the ignition timing, and the ignition timing control unit may calculate the retard angle limit ignition timing (IGLGG) by using the laminar combustion velocity (SL), a rotational speed (NE) of the engine, and an intake air amount (GAIRCYL) of the engine and may control the ignition timing (IGLOG) such that the ignition timing (IGLOG) is not set to a retard angle side of the retard angle limit ignition timing (IGLGG).

In this configuration, the retard angle limit ignition timing of the ignition timing is calculated by using the laminar combustion velocity, the engine rotational speed, and the intake air amount. Thus, the computation process of the retard angle limit ignition timing in the transient state may be simplified.

A sixth aspect of the present disclosure provides the control device of an internal combustion engine according to the third or fourth aspect, in which the engine may include a valve actuation phase variable mechanism that is capable of changing an actuation phase (CAIN) of an intake valve of the engine, and the ignition timing control unit may calculate the maximum torque ignition timing (IGMAP) and/or the knock-limit ignition timing (IGKNK) by using the actuation phase (CAIN).

In this configuration, the maximum torque ignition timing and/or the knock-limit ignition timing are calculated by using an intake valve actuation phase. Thus, an appropriate control value may be obtained in response to the change in the intake valve actuation phase.

A seventh aspect of the present disclosure provides the control device of an internal combustion engine according to any one of the first to sixth aspects, further including a cylinder internal pressure sensor that detects a pressure in the combustion chamber, in which the laminar combustion velocity calculation unit may calculate the laminar combustion velocity (SL) by using the air-fuel ratio (AF), the exhaust gas reflux rate (REGR) as a proportion of exhaust gas that is included in the air-fuel mixture, a cylinder internal gas temperature (TGAS) as a gas temperature in the combustion chamber at a time immediately before the air-fuel mixture starts combustion in the combustion chamber, and a cylinder internal pressure (PCYL) that is detected by the cylinder internal pressure sensor.

In this configuration, the laminar combustion velocity is calculated by using the air-fuel ratio, the exhaust gas reflux rate, the cylinder internal gas temperature, and the detected cylinder internal pressure. More accurate estimation of the cylinder internal gas temperature is possible by using the cylinder internal pressure that is detected by the cylinder internal pressure sensor, and the laminar combustion velocity with higher precision may be obtained by using the detected cylinder internal pressure. As a result, calculation precision of the ignition timing control parameters may be enhanced.

Obviously, numerous modifications and variations of the present invention are possible in light of the above teachings. It is therefore to be understood that within the scope of the appended claims, the invention may be practiced otherwise than as specifically described herein.

What is claimed is:

1. A control device for an internal combustion engine, comprising:

an air-fuel ratio controller to execute a stoichiometric operation in which an air-fuel ratio of an air-fuel mixture in a combustion chamber of the internal combustion engine is controlled to be a stoichiometric air-fuel ratio and a lean operation in which the air-fuel ratio is controlled to be an air-fuel ratio leaner than the stoichiometric air-fuel ratio;

an exhaust gas reflux controller to control an exhaust gas reflux mechanism to reflux an exhaust gas from the combustion chamber to an intake system of the internal combustion engine to control an exhaust gas reflux rate;

a laminar combustion velocity calculator to calculate a laminar combustion velocity of combustion gas in the combustion chamber based on the exhaust gas reflux rate and a parameter indicating the air-fuel ratio; and an ignition timing controller to calculate at least one ignition timing control parameter based on the laminar combustion velocity calculated by the laminar combustion velocity calculator and to control an ignition plug provided in the combustion chamber to ignite based on the at least one ignition timing control parameter in a transitional state between the stoichiometric operation and the lean operation, wherein the at least one ignition timing control parameter includes a maximum torque ignition timing at which an output torque of the engine is maximized, and the ignition timing control unit calculates the maximum torque ignition timing based on a single map that is set in accordance with the laminar combustion velocity and a rotational speed of the engine.

2. The control device of an internal combustion engine according to claim 1, wherein the at least one ignition timing control parameter includes ignition timing control parameters.

3. The control device according to claim 1, wherein
the engine includes a valve actuation phase variable mechanism to change an actuation phase of an intake valve of the engine, and
the ignition timing controller calculates the maximum torque ignition timing and/or a knock-limit ignition timing based on the actuation phase.

4. The control device according to claim 1, further comprising:
a cylinder internal pressure sensor to detect a pressure in the combustion chamber, wherein
the laminar combustion velocity calculator calculates the laminar combustion velocity based on the air-fuel ratio, the exhaust gas reflux rate that is a proportion of exhaust gas included in the air-fuel mixture, a cylinder internal gas temperature that is a gas temperature in the combustion chamber at a time immediately before the air-fuel mixture starts combustion in the combustion chamber, and a cylinder internal pressure detected by the cylinder internal pressure sensor.

5. A control device for an internal combustion engine, comprising:
an air-fuel ratio controller to execute a stoichiometric operation in which an air-fuel ratio of an air-fuel mixture in a combustion chamber of the internal combustion engine is controlled to be a stoichiometric air-fuel ratio and a lean operation in which the air-fuel ratio is controlled to be an air-fuel ratio leaner than the stoichiometric air-fuel ratio;
an exhaust gas reflux controller to control an exhaust gas reflux mechanism to reflux an exhaust gas from the combustion chamber to an intake system of the internal combustion engine to control an exhaust gas reflux rate;
a laminar combustion velocity calculator to calculate a laminar combustion velocity of combustion gas in the combustion chamber based on the exhaust gas reflux rate and a parameter indicating the air-fuel ratio; and
an ignition timing controller to calculate at least one ignition timing control parameter based on the laminar combustion velocity calculated by the laminar combustion velocity calculator and to control an ignition plug provided in the combustion chamber to ignite based on the at least one ignition timing control parameter in a transitional state between the stoichiometric operation and the lean operation, wherein
the at least one ignition timing control parameter includes a knock-limit ignition timing corresponding to a most advanced angle value in an ignition timing range in which a possibility that knocking occurs in the engine is lower than a possibility threshold, and
the ignition timing controller calculates the knock-limit ignition timing based on the laminar combustion velocity, a rotational speed of the engine, and an intake air amount of the engine.

6. A control device for an internal combustion engine, comprising:
an air-fuel ratio controller to execute a stoichiometric operation in which an air-fuel ratio of an air-fuel mixture in a combustion chamber of the internal combustion engine is controlled to be a stoichiometric air-fuel ratio and a lean operation in which the air-fuel ratio is controlled to be an air-fuel ratio leaner than the stoichiometric air-fuel ratio;
an exhaust gas reflux controller to control an exhaust gas reflux mechanism to reflux an exhaust gas from the combustion chamber to an intake system of the internal combustion engine to control an exhaust gas reflux rate;
a laminar combustion velocity calculator to calculate a laminar combustion velocity of combustion gas in the combustion chamber based on the exhaust gas reflux rate and a parameter indicating the air-fuel ratio; and
an ignition timing controller to calculate at least one ignition timing control parameter based on the laminar combustion velocity calculated by the laminar combustion velocity calculator and to control an ignition plug provided in the combustion chamber to ignite based on the at least one ignition timing control parameter in a transitional state between the stoichiometric operation and the lean operation, wherein
the at least one ignition timing control parameter includes a retard angle limit ignition timing of the ignition timing, and
the ignition timing controller calculates the retard angle limit ignition timing based on the laminar combustion velocity, a rotational speed of the engine, and an intake air amount of the engine and controls the ignition timing such that the ignition timing is not set to a retard angle side of the retard angle limit ignition timing.

* * * * *